(12) United States Patent
Cho et al.

(10) Patent No.: US 9,794,317 B2
(45) Date of Patent: Oct. 17, 2017

(54) NETWORK SYSTEM AND NETWORK METHOD

(71) Applicant: HANWHA TECHWIN CO., LTD., Changwon-Si (KR)

(72) Inventors: Sung Bong Cho, Changwon-si (KR); Hee Jin Cheon, Changwon-si (KR); Young Hun Na, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 388 days.

(21) Appl. No.: 14/278,123

(22) Filed: May 15, 2014

(65) Prior Publication Data

US 2015/0089024 A1    Mar. 26, 2015

(30) Foreign Application Priority Data

Sep. 25, 2013 (KR) .................. 10-2013-0114136

(51) Int. Cl.
H04L 29/06 (2006.01)
H04L 12/859 (2013.01)
H04L 12/825 (2013.01)
H04L 12/853 (2013.01)

(52) U.S. Cl.
CPC ............ *H04L 65/602* (2013.01); *H04L 47/25* (2013.01); *H04L 65/4084* (2013.01); *H04L 65/4092* (2013.01); *H04L 47/2416* (2013.01)

(58) Field of Classification Search
CPC .................. H04L 65/602; H04L 47/2475
See application file for complete search history.

(56) References Cited

U.S. PATENT DOCUMENTS

| | | | |
|---|---|---|---|
| 8,671,435 B2 | 3/2014 | Bae | |
| 2006/0242678 A1* | 10/2006 | Kostadinovich | H04N 5/76 725/105 |
| 2007/0052809 A1* | 3/2007 | Hammadou | H04N 7/185 348/211.3 |
| 2008/0028083 A1* | 1/2008 | Rezvani | H04L 47/10 709/229 |
| 2009/0185040 A1* | 7/2009 | Yang | H04L 65/4092 348/207.11 |
| 2010/0316066 A1* | 12/2010 | Leung | H04N 21/44209 370/468 |
| 2011/0058036 A1* | 3/2011 | Metzger | H04N 7/181 348/143 |
| 2011/0126250 A1* | 5/2011 | Turner | H04N 5/76 725/109 |

FOREIGN PATENT DOCUMENTS

| | | |
|---|---|---|
| KR | 10-2005-0062945 A | 6/2005 |
| KR | 10-2006-0030879 A | 4/2006 |
| KR | 10-2012-0033450 A | 4/2012 |

\* cited by examiner

*Primary Examiner* — Nicholas Taylor
*Assistant Examiner* — Sanjoy Roy
(74) *Attorney, Agent, or Firm* — Sughrue Mion, PLLC

(57) ABSTRACT

Provided are a network system and a network method. The network system includes: at least one network camera; at least one client configured to receive an image or a moving image from the at least one network camera; and a network configured to relay communication between the at least one network camera and the at least one client, wherein the at least one client is further configured to transmit an auto traffic control (ATC) priority and a setting corresponding to the applying of the ATC function while requesting to be connected to the at least one network camera.

20 Claims, 4 Drawing Sheets

NETWORK SYSTEM AND NETWORK METHOD

CROSS-REFERENCE TO RELATED APPLICATION(S)

This application claims priority from Korean Patent Application No. 10-2013-0114136, filed on Sep. 25, 2013, in the Korean Intellectual Property Office, the disclosure of which is incorporated herein by reference in its entirety.

BACKGROUND

1. Field

Apparatuses and methods consistent with exemplary embodiments relate to a network system and a network method, and more particularly, to a network system and a network method, which use a network camera that differs in applying auto traffic control according to a type and priority of a client.

2. Description of the Related Art

An auto traffic control function applied to a general internet protocol (IP) camera or video server is a function of setting data to be transmitted according to network states, by transmitting image data after reducing a frame rate or bit rate regardless of the type or number of clients receiving the image data when network congestion occurs.

In technologies of the related art, when various types of clients are connected to each other within different network environments, a setting profile is changed if congestion occurs due to a high load in a network to which a certain client is connected. Thus, a client whose network state is satisfactory may also receive a deteriorated image.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments include a network system and a network method, wherein a frame rate and a bit rate of an image are individually adjusted according to characteristics of clients and network environments.

Additional aspects will be set forth in part in the description which follows and, in part, will be apparent from the description, or may be learned by practice of the exemplary embodiments.

According to an aspect of an exemplary embodiment, there is provided a network system including: at least one network camera configured to apply an auto traffic control (ATC) function for adjusting at least one of a frame rate and a bit rate of image data based on a network congestion state; at least one client configured to receive the image data from the at least one network camera; and a network configured to relay communication between the at least one network camera and the at least one client, wherein the at least one client is further configured to transmit a setting corresponding to the applying of the ATC function while requesting to be connected to the at least one network camera.

Even when the ATC function of the at least one network camera is in an on-state, the ATC function may be turned off based on the setting corresponding to the applying of the ATC function.

The applying of the ATC function may include applying a value included in a user-agent field, in response to the at least one client being connected to the at least one network camera by using at least one of a real-time transport protocol (RTP) and a real-time streaming protocol (RTSP).

The at least one client may further be configured to transmit an ATC priority while requesting to be connected to the at least one network camera.

The at least one network camera may be further configure to turn the ATC function on or off based on a network congestion state of a client whose ATC priority is highest from among the at least one client.

The ATC priority may be included in a user-agent field, in response to the at least one client being connected to the at least one network camera by using at least one of a real-time transport protocol (RTP) and a real-time streaming protocol (RTSP).

A type of the at one client may include a viewer device or a storage device, and the ATC priority of the storage device may be higher than that of the viewer device.

The at least one network camera may be further configured to turn on the ATC function based on the network congestion state.

In response to the ATC function of the at least one network camera being turned on, the at least one of the frame rate and the bit rate of the image data transmitted from the at least one network camera to the at least one client may be reduced.

The network may be further configured to use at least one of a real-time transport protocol (RTP) and a real-time streaming protocol (RTSP).

A user-agent field of the RTSP may include ATC=ON or ATC=OFF.

When the at least one client is a network video recorder (NVR), the NVR may include ACT=OFF in the user-agent field.

According to an aspect of another exemplary embodiment, there is provided a network method including: storing a setting about applying of an auto traffic control (ATC) function, wherein the storing is performed by at least one client; transmitting a connection request to a network camera along with the stored setting, wherein the transmitting is performed by the at least one client; determining whether to apply an ATC function based on the setting and a network congestion state, wherein the determining is performed by the network camera; and reproducing or storing image data received from the network camera, wherein the reproducing or storing is performed by the at least one client.

In response to the ATC function of the network camera being turned on, at least one of a frame rate and bit rate of the image data transmitted from the network camera to the at least one client may be reduced.

Even when the ATC function is in an on-state, the network camera may turn off the ATC function based on the setting corresponding to the application of the ATC function.

The setting may include a value included in a user-agent field of at least one of a real-time transport protocol (RTP) and a real-time streaming protocol (RTSP).

In the transmitting of the connection request, an ATC priority may be also transmitted.

The network camera may turn the ATC function on or off based on the network congestion state of a client whose ATC priority is highest from among the at least one client.

A type of the at least one client may include a viewer device or storage device, and the ATC priority of the storage device may be higher than that of the viewer device.

Accordingly to an aspect of another exemplary embodiment, there is provided a non-transitory computer readable medium having recorded thereon a program, which, when executed by a computer, performs above-recited method.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
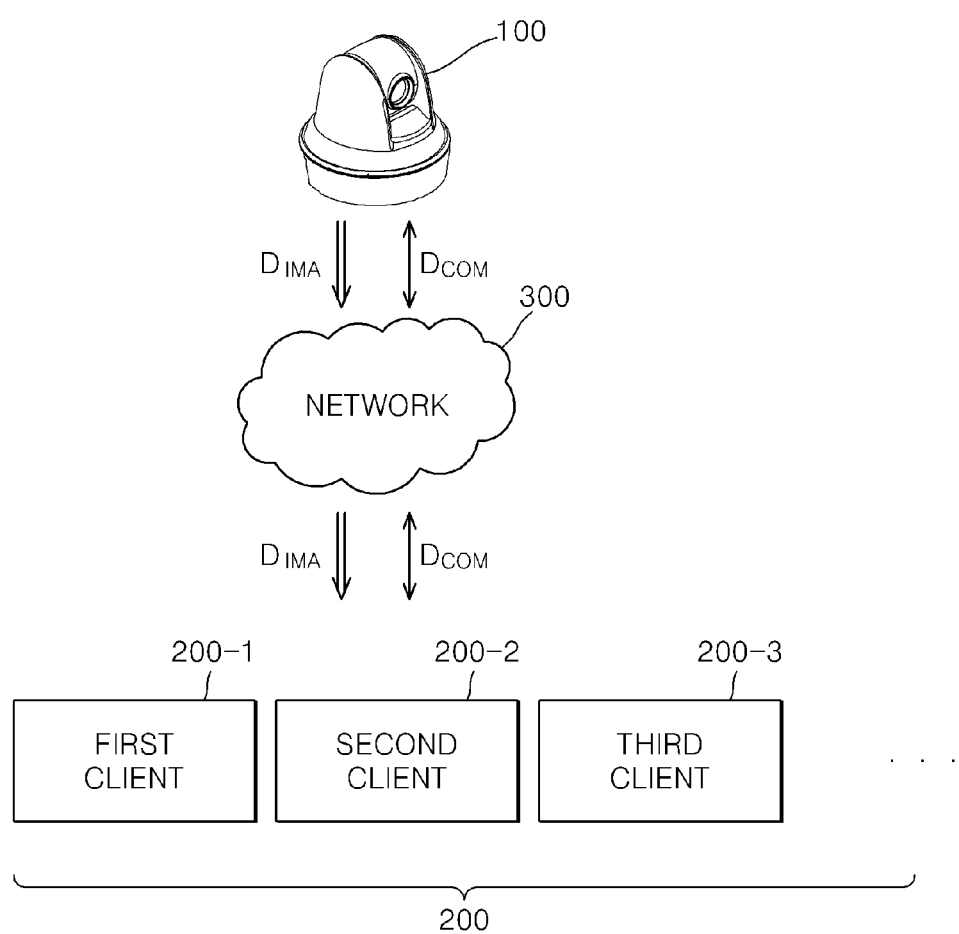
FIG. 1 is a diagram of a network system according to an exemplary embodiment.

Hereinafter, certain exemplary embodiments will be described more fully with reference to the accompanying drawings. The matters defined in the description, such as detailed construction and elements, are provided to assist in a comprehensive understanding of the exemplary embodiments. Thus, it is apparent that the exemplary embodiments can be carried out without those specifically defined matters. In the drawings, like reference numerals denote like elements. As used herein, the term "and/or" includes any and all combinations of one or more of the associated listed items. Also, well-known functions or constructions are not described in detail since they would obscure the exemplary embodiments with unnecessary detail.

FIG. 1 is a diagram of a network system according to an exemplary embodiment.

Referring to FIG. 1, the network system may include a network camera 100, at least one client 200, and a network 300.

The network camera 100 of FIG. 1 may be an internet protocol (IP) camera. An image or moving image captured by the network camera 100 may be transmitted through the network 300. The network camera 100 may be connected to the at least one client 200 via a wired or wireless communication network.

Referring to FIG. 1, a network camera 100 transmits and receives data to and from a plurality of the clients 200 through the network 300. In detail, the network camera 100 communicates with the plurality of the clients 200 through a communication channel $D_{COM}$ while transmitting image or moving image data to the plurality of the clients 200 through an image data channel $D_{IMA}$. However, the current exemplary embodiment is not limited thereto, and a plurality of the network cameras 100, instead of the single network camera 100, may communicate with the client 200, or one or more network cameras 100 may communicate with the plurality of clients 200. Here, the network 300 forming the communication channel $D_{COM}$ and the image data channel $D_{IMA}$ may be any unit capable of transferring data or a command wirelessly or via wires. For example, the network 300 may connect the network camera 100 and the client 200 via wires by using a cable, or wirelessly by using a wireless local area network (WLAN). The network camera 100 may be a video server having a general camera function.

According to an exemplary embodiment, the network camera 100 may be a camera having an auto traffic control (ATC) function. Details and function application standards of the ATC function will be described in greater detail later.

First through third clients 200-1 through 200-3 may be any device for reproducing or storing an image or a moving image received from the network camera 100. The first through third clients 200-1 through 200-3 may be commonly referred to as the clients 200. Also, according to an exemplary embodiment, the clients 200 may be a device capable of communicating with the network camera 100 according to a real-time protocol (RTP)/real-time streaming protocol (RTSP). A real time streaming protocol (RTSP) is a protocol of an application level for controlling transmission of data having a real time attribute.

The at least one client 200 is connected to the network camera 100 through the network 300, and types of the clients 200 may differ from each other. Examples of the types of clients 200 include user terminals having a viewer function, such as a mobile phone, a personal computer (PC), and a monitoring viewer, and recording servers having a storage function, such as a network video recorder (NVR). However, the types of clients 200 are not limited thereto, and may be any device for receiving an image from the network camera 100.

For example, the first client 200-1 may be an NVR, the second client 200-2 may be a PC of a user, and the third client 200-3 may be a device only operating as a viewer. Here, the clients 200 may require different image qualities due to their different respective purposes. For example, when the client 200 is a user terminal, such as a smart phone, the client 200 only has a viewer function, and thus a high quality image may not need be received from the network camera 100. However, when the client 200 is a device having a recording function, such as an NVR, the client 200 may need to receive an intact original image. According to an exemplary embodiment, the clients 200 may include values related to application of an ATC function and an ATC priority in a user-agent field that is one of the option fields of an RTP/RTSP according to characteristics of the clients 200 so that communication environments are controlled according to characteristics of the clients 200.

The network 300 obtains image or moving image data from the network camera 100, and transmits the obtained image or moving image data to the clients 200. In other words, the network 300 provides a connection path for the clients 200 to connect to the network camera 100 and then transmits and receives packet data to and from the network camera 100. The network 300 may be configured regardless of a communication type, such as wired communication or wireless communication, and may be any one of various networks, such as a local area network (LAN), a metropolitan area network (MAN), and a wide area network (WAN). However, the network 300 is not limited thereto, and may partially include well-known wired/wireless data networks, well-known telephone networks, or well-known wired/wireless television (TV) networks.

Here, the network 300 may use an RTSP to transmit an image or may use an RTP to transmit general data. According to an exemplary embodiment, application of an ATC function or an ATC priority may be included in an option field of communication data applied to an RTSP/RTP.

Although the plurality of clients 200 are illustrated as being connected to the network 300 in FIG. 1, the plurality of clients 200 may also be connected to individual networks. Accordingly, an individual network congestion state may occur according to the clients 200. For example, the network 300 to which the first client 200-1 is connected may be in a network congestion state whereas the network 300 to which the second client 200-2 is connected is not in a network congestion state. According to an exemplary embodiment, the network camera 100 refers to network congestion of each client 200 while determining whether to apply an ATC function by first considering the network congestion state of the client 200 whose ATC priority is high.

Figure 2:
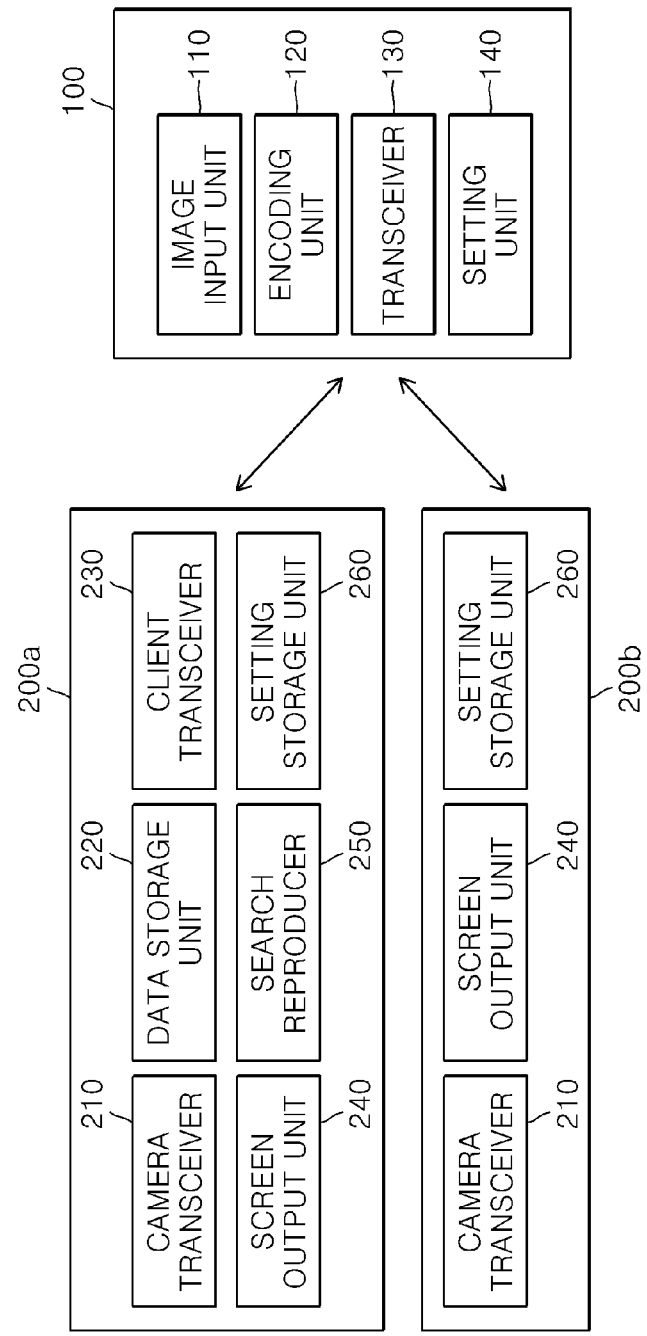
FIG. 2 is a diagram for describing internal functions of each component of the network system of FIG. 1.

FIG. 2 is a diagram for describing in greater detail internal functions of each component of the network system of FIG. 1. In FIG. 2, first and second clients 200a and 200b are connected to the network camera 100, wherein the types of the first and second clients 200a and 200b are different from each other.

The network camera 100 includes an image input unit 110, an encoding unit 120, a transceiver 130, and a setting unit 140.

The image input unit 110 may be included for changing an image captured by using an image sensor, such as a charge-coupled device (CCD), to a digital signal.

The encoding unit 120 may be included for compressing the digital signal obtained by the image input unit 110 to a resolution, a frame rate, and a bit rate set according to profile information.

The transceiver 130 receives an image transmit request from the at least one client 200 through the network 300, and transmits image or moving image data compressed by the encoding unit 120 to the network 300.

Then, the setting unit 140 may change profile setting information of the encoding unit 120 by determining whether to apply an ATC function by referring to transmission and reception states of the at least one client 200 connected to the network camera 100. The profile setting information includes a frame rate and a bit rate of an encoded image during encoding. According to an exemplary embodiment, the profile setting information may be changed according to an ATC setting.

The ATC function is a function for transmitting image data according to a network state by reducing a frame rate or a bit rate when network congestion occurs.

In other words, the setting unit 140 in the network camera 100 may adjust the frame rate or the bit rate of the image data compressed by the encoding unit 120 to support smooth communication even when network congestion occurs. For example, when network congestion occurs in the network 300 such that data is not transmitted normally or smoothly, the network congestion may be relieved by reducing a frame rate or bit rate in the attributes of a set image profile to reduce the data to be transmitted.

However, ATC setting information and setting information of an image profile is changed regardless of the types or number of the clients 200 when it is determined that network congestion occurred by checking a delay state in a network protocol. When the attributes of a profile are changed by changing an encoding setting regardless of the types of number of the clients 200, frame rates or bit rates are all changed. For example, when the ATC function is in an on-state, the network camera 100 reduces a frame rate or bit rate of an encoded image, and when the ATC function is in an off-state, the network camera 100 may maintain a frame rate or bit rate of an encoded image. Meanwhile, since one network camera 100 may be connected to at least one client 200 as shown in FIGS. 1 and 2, when frame rates or bit rates are adjusted together due to network congestion in the network 300, attributes of image data transmitted to the at least one client 200 may be changed.

For example, the ATC function may be turned on due to occurrence of a network congestion state when the client 200 that is a mobile viewer is additionally connected to the network 300. In this case, an image having a reduced frame rate or bit rate is transmitted to an important recording device, such as an NVR, which is the client 200 that has a storage function, in response to the mobile viewer that is less important being connected. As a result, an image having a deteriorated quality is stored in the NVR.

A network congestion state is more likely occur in the client 200, such as a mobile phone, and a network congestion state is less likely to occur in the client 200, such as an NVR, connected to a LAN, and thus when a quality of an entire image is deteriorated due to the network congestion state in one client 200, an image that is different from a user's intention may be transmitted.

In summary, when one network camera 100 is connected to the plurality of clients 200 and attributes of a profile in the network camera 100 are changed due to a network congestion state in one client 200, other clients 200 that receive an image to which the same profile is applied are affected and thus may receive an image whose frame rate is reduced or quality is deteriorated.

Thus, according to an exemplary embodiment, the setting unit 140 of the network camera 100 determines whether to apply an ACT function by considering characteristics of the client 200 and network 300 connected to each other while referring to application of an ATC function and an ATC priority in a user-agent field of an RTP/RTSP. In detail, when the client 200 having high importance, such as an NVR, includes a setting of turning on or off an ATC function in a user-agent field, the ATC function is turned on or off when the corresponding client 200 is connected. Alternatively, the application of the ATC function may be determined by considering network congestion of each client 200 based on the ATC priority in the user-agent field of the client 200.

For example, even when the ATC function is currently in an on-state, i.e., is currently activated, the setting unit 140 may turn off the ATC function of the network camera 100 based on individual characteristics of the client 200 received from the client 200. The encoding unit 120 may determine an image profile setting related to a frame rate and a bit rate based on the application of the ATC function.

According to an exemplary embodiment, the setting unit 140 may determine whether to apply the ATC function by considering the ATC priority. When the ATC priority of the client 200 connected to the network camera 100 is included in the user-agent field, the setting unit 140 may determine to apply the ATC function based on a network congestion state of the client 200 whose ATC priority is high. Alternatively, the setting unit 140 may determine whether to apply the ATC function according to a value of the user-agent field of the client 200 whose ATC priority is high.

The first client 200a includes a camera transceiver 210, a data storage unit 220, a client transceiver 230, a screen output unit 240, a search reproducer 250, and a setting storage unit 260. According to an exemplary embodiment, the first client 200a may be an NVR that receives and stores image or audio data from the network camera 100.

The camera transceiver 210 receives image data from the network camera 100. The data storage unit 220 stores the received image data, and the client transceiver 230 transmits and receives image data to and from another client. The screen output unit 240 encodes and outputs the image data stored in the data storage unit 220, and performs decoding while outputting the image data to output or display image data in a format suitable to the first client 200a. The search reproducer 250 may search for an image requested to be viewed by the user from among the images stored in the data storage unit 220, and provide a result of the search to the screen output unit 240.

Lastly, the setting storage unit 260 may include a field indicating attributes of the first client 200a when connected to the network camera 100, according to characteristics of the first client 200a and network 300 to which the first client 200a is connected.

Also, referring to FIG. 2, the client 200, such as the second client 200b as well as the first client 200a, may communicate with the network camera 100. Unlike the first client 200a, the second client 200b may include only the camera transceiver 210, the screen output unit 240, and the setting storage unit 260. Herein, units having the same reference numerals may have the same functions.

The second client 200b may be a monitoring viewer. Whereas the first client 200a is a device having a storage function, the second client 200b is the monitoring viewer and thus may not have functions performed by the data storage unit 220, the client transceiver 230, and the search reproducer 250.

The setting storage units 260 of the first and second clients 200a and 200b may set values of user-agent fields by reflecting characteristics of the first and second clients 200a and 200b while communicating with the network camera 100 via an RTP/RTSP. For example, a client having a storage function, such as the first client 200a, may include representations in the user-agent field indicating that an ATC setting value is OFF and an ATC priority is high. On the other hand, a client only having a monitoring function, such as the second client 200b, may include representations in the user-agent field indicating that an ATC setting value is ON and an ATC priority is low when connected to the network camera 100.

The setting storage unit 260 may set one, both, or none of the ATC setting value and the ATC priority.

As such, the setting storage unit 260 according to an exemplary embodiment may adjust a setting value indicating whether to apply an ATC function and an ATC priority of each client 200 connected to the network camera 100, while having compatibility with an existing protocol, by using a user-agent field of an options method of an RTP/RTSP used to transmit and receive an image of the network camera 100.

The setting storage unit 260 applies an ATC function and an ATC priority of the first client 200a in a user-agent field. The application the ATF function may be indicated by ON/OFF. The ATC priority may be indicated by a number. The setting storage unit 260 may set a high ATC priority for the client 200 that is used as a main storage device, such as an NVR, a medium ATC priority for the client 200 that is used as a real-time image monitoring device, and a low ATC priority for the client 200 that is used as a mobile viewer or that has a low bandwidth. For example, the setting storage unit 260 may store a setting value for turning off an ATC function and a setting value for setting an ATC priority high in a user-agent field when the first client 200a is a storage device, such as an NVR. In this case, the ATC function of the network camera 100 may be turned off when the first client 200a is connected, even when the ATC function was in an on-state.

As such, the setting storage unit 260 may enable image information having an original high resolution or original high quality to be recorded in the client 200 having a storage function by preventing an ATC function from being applied, based on characteristics of the clients 200. In other words, when clients 200 having different bandwidths are connected to the network 300, application of an ATC function may be determined based on characteristics of the clients 200.

The table below shows an example of the setting storage unit 260 including an ATC setting value and an ATC priority in a user-agent field, according to an exemplary embodiment. In Example 1, ATC=OFF is added to the user-agent field, which means that the client 200 does not use an ATC function. In Example 2, ATC=10 is added to the user-agent field, which means that an ATC priority of the client 200 is 10.

TABLE

| Example of User-Agent Field | |
|---|---|
| General RTSP | User-Agent: RealMedia Player (HelixDNAcleint(200))/ 10.0.0.0 (win32) |
| Example 1 | User-Agent: RealMedia Player (HelixDNAclient(200))/ 10.0.0.0 (win32) ATC = OFF |
| Example 2 | User-Agent: RealMedia Player (HelixDNAclient(200))/ 10.0.0.0 (win32) ATC = 10 |

Example 1 may be applied to the client 200 having a storage function. When the data storage unit 220, which is a unit for storing an image, is included, as in the first client 200a, an image unintended by the user may be stored if a profile of image data is changed by another client 200 connected to the network 300. Accordingly, an ATC function may not be performed in the first client 200a. Here, the user-agent field, i.e., an option field, transmitted by the client 200 may include ATC=OFF as in Example 1. In this case, the network camera 100 to which the first client 200a is connected may change an ATC function to an off-state when it is in an on-state.

Alternatively, when an ATC priority of the client 200 is included in an option field as in Example 2, the setting unit 140 of the network camera 100 may determine whether to apply an ATC function according to a network congestion state of the client 200 whose ATC priority is high. Alternatively, the application of an ATC function may be determined according to the user-agent field of the client 200 whose ATC priority is high.

Figure 3:
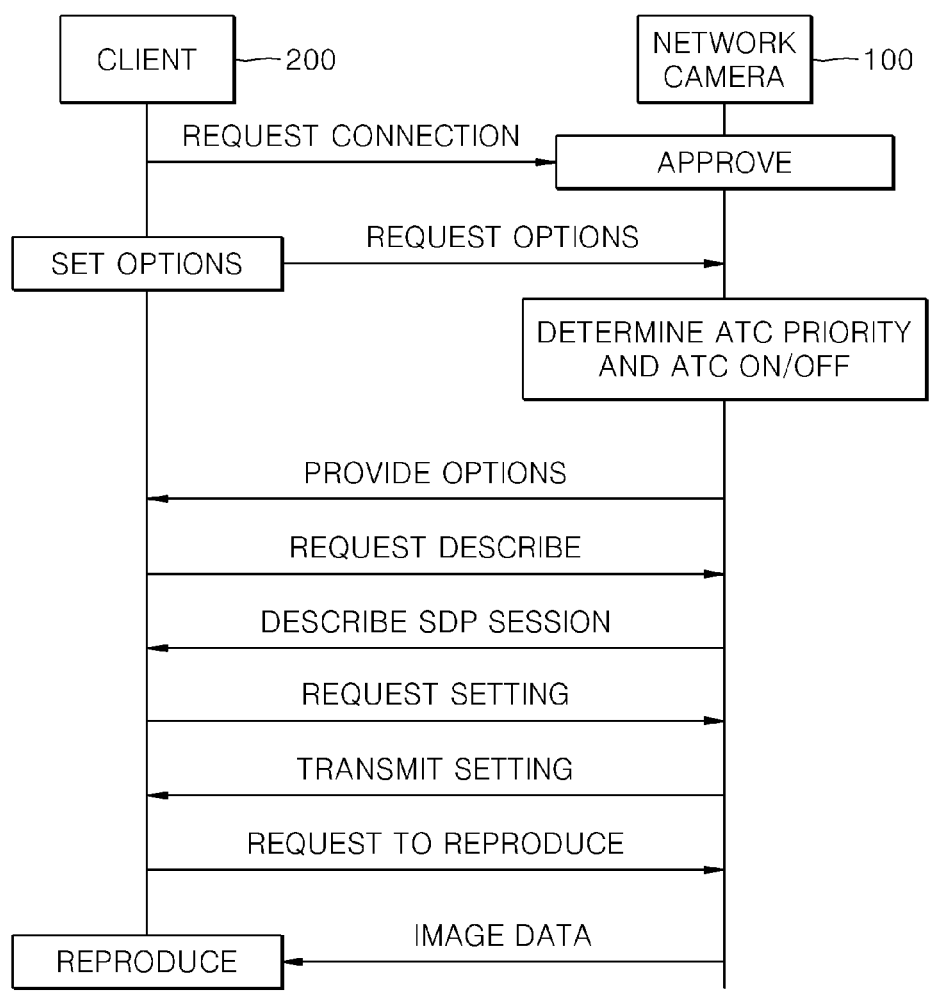
FIG. 3 is a diagram for describing communication between a network camera and a client, according to an exemplary embodiment.

FIG. 3 is a diagram for describing communication between the network camera 100 and the client 200, according to an exemplary embodiment.

First, the client 200 transmits a network connection request to the network camera 100. Upon receiving the network connection request, the network camera 100 approves connection.

Then, the client 200 sets the application of an ATC function and an ATC priority according to a bandwidth and the client 200 through setting options. The client 200 transmits a request to the network camera 100 to transmit an options method with a field describing the application of the ATC function and the ATC priority, and the network camera 100 transmits a response to the options method. While setting the options the options method may notify the client 200 of a method supported by the network camera 100.

Here, the network camera 100 may include values describing the application of the ATC function and the ATC priority in the user-agent field included in the options method of the client 200. The network camera 100 determines whether to apply the ATC function and the ATC priority of the client 200 by referring to the user-agent field.

The network camera 100 may determine whether to use the ATC function and determine a priority when the ATC function is used in an image to be transmitted by referring to the user-agent field included in the options method.

Then, the client 200 transmits a request "DESCRIBE", which is a method for obtaining a specification about a media object or presentation. Upon receiving "DESCRIBE", the network camera 100 transmits a session description protocol (SDP) as a response and may use an accept header about a specification format to be recognized by the client 200.

Next, the client 200 transmits a request for a setup method that is a method for describing a method of transmitting a media stream during requesting and transmitting of a setting, along with transmission related factors acceptable by the client 200. The network camera 100 transmits the setup method and prepares for streaming.

Then, the client 200 transmits a request for a play method while requesting to reproduce image data, and reproduces the image data received from the network camera 100.

Figure 4:
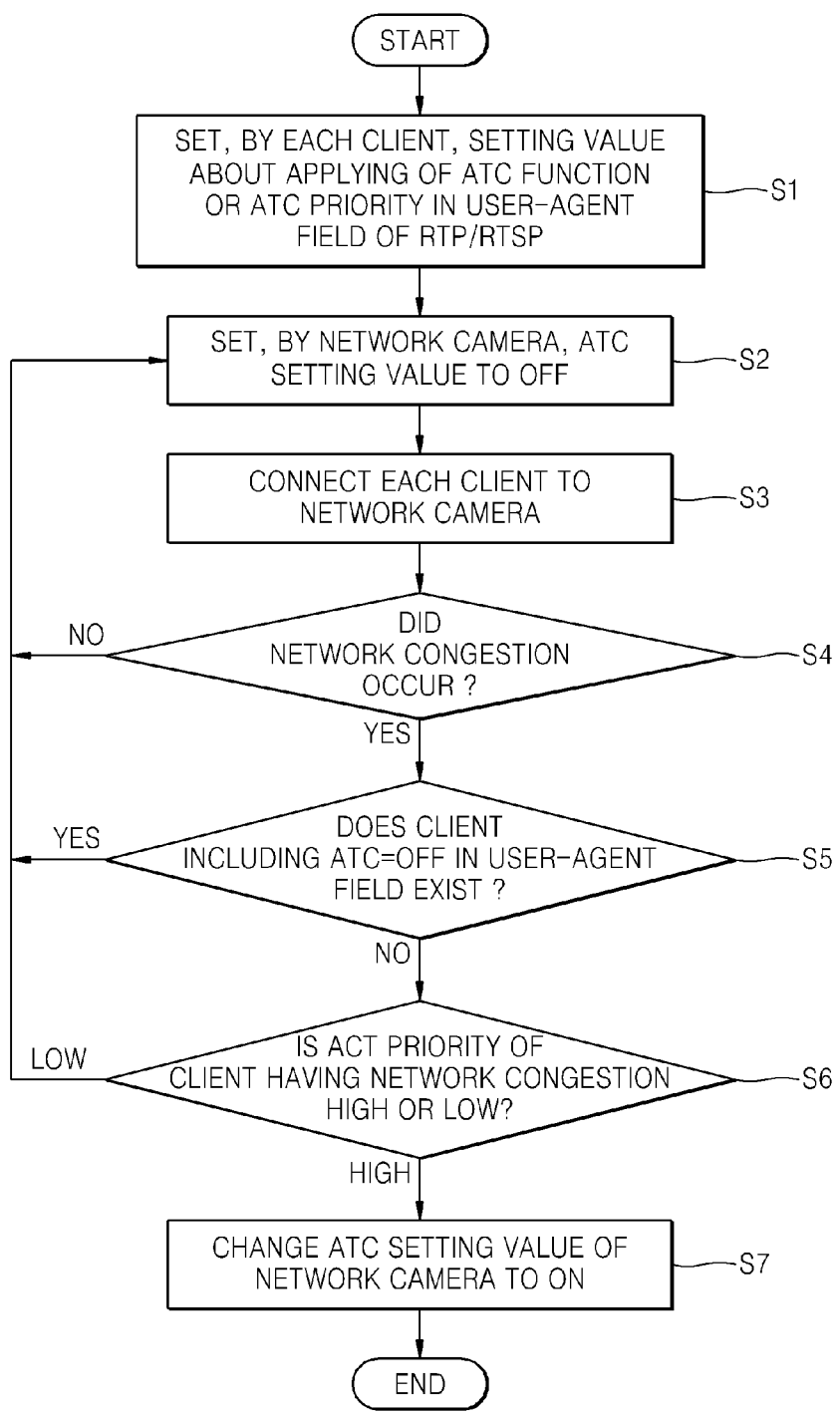
FIG. 4 is a flowchart of a network method of a network system, according to an exemplary embodiment.

FIG. 4 is a flowchart of a network method of a network system, according to an exemplary embodiment.

Referring to FIG. 4, first, each client sets a setting value indicating the application of an ATC function or an ATC priority in a user-agent field of an RTP/RTSP, in operation S1.

Then, a network camera sets an ATC setting value to OFF, a basic value, in operation S2.

Next, each client is connected to the network camera, in operation S3, and it is determined whether network congestion occurred, in operation S4. If the network congestion did not occur, the ATC setting value is maintained as OFF.

If the network congestion occurred, it is determined whether there is a client including ATC=OFF in a user-agent field, in operation S5. As described above, an important client, such as a storage device, may include ATC=OFF in an user-agent field to prevent an ATC function from being activated. If the client including ATC=OFF exists, the ATC setting value is maintained as OFF.

If the client including ATC=OFF does not exist, it is determined whether an ATC priority of a client connected to a network having network congestion is high or low, in operation S6. If network congestion occurred in a client whose ATC priority is low, the ACT setting value is maintained as OFF.

On the other hand, if network congestion occurred in a client whose ATC priority is high, the ACT setting value is changed to ON, in operation S7.

The network method shown in FIG. 4 is only an example and thus an order of performing the operations may vary. For example, after it is determined whether network congestion occurred in operation S4, the ATC setting value may be then changed to ON in operation S7 when the network congestion occurred. Next, when ATC=OFF is included in the user-agent field of the client in operation S5, the ACT setting value may be changed to OFF again in operation S2. As such, the order of performing operations may vary as long as distinctive features of one or more exemplary embodiments are intact.

As described above, according to the one or more of the above exemplary embodiments, a profile of an image may be adjusted according to clients.

The methods described above may be recorded on a computer readable recording medium by being realized in computer programs executed by using various computers including at least one processor. The computer readable recording medium may include at least one of a program command, a data file, and a data structure. The program commands recorded in the computer readable recording medium may be specially designed or well-known to one of ordinary skill in the computer software field. Examples of the computer readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter. The hardware device may be configured to operate as at least one software module to perform operations of the methods, or vice versa.

The particular implementations shown and described herein are illustrative and are not intended to otherwise limit the scope of the exemplary embodiments in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the exemplary embodiments and does not pose a limitation on the scope of the exemplary embodiments unless otherwise claimed. Numerous modifications and adaptations will be readily apparent to those of ordinary skill in this art without departing from the spirit and scope of the inventive concept, as defined by the appended claims.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the appended claims.

What is claimed is:

1. A network system comprising at least one processor to implement:
   at least one network camera configured to apply an auto traffic control (ATC) function for adjusting at least one of a frame rate and a bit rate of image data, based on a network congestion state; and at least one client apparatus configured to store a setting indicating application of the ATC function which is determined based on a characteristic of the at least one client apparatus and receive the image data from the at least one network camera, the characteristic of the at least one client apparatus being determined based on a type of the at least one client apparatus, wherein the at least one client apparatus is further configured to transmit a connection request to the at least one network camera and the setting corresponding to the application of the ATC function, and the at least one network camera is further configured to determine whether to apply the ATC function based on the characteristic of the at least one client apparatus.

2. The network system of claim 1, wherein, even when the ATC function of the at least one network camera is in an on-state, the ATC function is turned off based on the setting corresponding to the applying of the ATC function.

3. The network system of claim 1, wherein the applying of the ATC function comprises applying a value included in a user-agent field, in response to the at least one client apparatus being connected to the at least one network camera by using at least one of a real-time transport protocol (RTP) and a real-time streaming protocol (RTSP).

4. The network system of claim 1, wherein the at least one client apparatus is further configured to transmit an ATC priority while requesting to be connected to the at least one network camera.

5. The network system of claim 4, wherein the at least one network camera is further configured to turn the ATC function on or off based on a network congestion state of a client apparatus whose auto traffic control priority is highest from among the at least one client.

6. The network system of claim 4, wherein the ATC priority is included in a user-agent field, in response to the at least one client apparatus being connected to the at least one network camera by using at least one of a real-time transport protocol (RTP) and a real-time streaming protocol (RTSP).

7. The network system of claim 4, wherein the type of the at least one client apparatus comprises a viewer device or a storage device, and wherein the ATC priority of the storage device is higher than that of the viewer device.

8. The network system of claim 1, wherein the network is further configured to use at least one of a real-time transport protocol (RTP) and a real-time streaming protocol (RTSP).

9. The network system of claim 8, wherein a user-agent field of the RTSP comprises ATC=ON or ATC=OFF.

10. The network system of claim 9, wherein, when the at least one client apparatus is a network video recorder (NVR), the user-agent field comprises ATC=OFF.

11. A network method performed by a network camera comprising:

receiving a connection request and a setting corresponding to application of an auto traffic control (ATC) function from at least one client apparatus, the setting indicating application of the ATC function which is determined based on a characteristic of the at least one client apparatus, and the characteristic of the at least one client apparatus being determined based on a type of the at least one client apparatus;

determining whether to apply the ATC function based on the setting and a network congestion state; and transmitting image data by changing profile setting information including at least one of a frame rate and bit rate of the image data, to the at least one client apparatus, according to the determination of the network camera whether to apply the ATC function, the profile setting information being the profile setting information of the image data encoded in an encoder of the network camera and including information regarding the frame rate and bit rate of the image data, and being changed according to the network congestion state and the setting corresponding to application of the ATC function.

12. The network method of claim 11, wherein, even when the ATC function is in an on-state, the network camera turns off the ATC function based on the setting corresponding to the application of the ATC function.

13. The network method of claim 11, wherein the setting comprises a value included in a user-agent field of at least one of a real-time transport protocol (RTP) and a real-time streaming protocol (RTSP).

14. The network method of claim 11, wherein in the receiving the connection request, an ATC priority is further received.

15. The network method of claim 14, wherein the network camera turns the ATC function on or off based on the network congestion state of a client apparatus whose ATC priority is highest from among the at least one client.

16. The network method of claim 14, wherein the type of the at least one client apparatus comprises a viewer device or storage device, and wherein the ATC priority of the storage device is higher than that of the viewer device.

17. A network method performed by at least one client apparatus comprising:

storing a setting corresponding to application of an auto traffic control (ATC) function which is determined based on a characteristic of the at least one client apparatus, the characteristic of the at least one client apparatus being determined based on a type of the at least one client apparatus;

transmitting a connection request to a network camera and the setting corresponding to application of the ATC function; and receiving image data changed profile setting information including at least one of a frame rate and bit rate of the image data, from the network camera, according to the determination of the network camera whether to apply the ATC function based on the setting and a network congestion state, the profile setting information being the profile setting information of the image data encoded in an encoder of the network camera and including information regarding the frame rate and bit rate of the image data, and being changed according to the network congestion state and the setting corresponding to application of the ATC function.

18. The network method of claim 17, wherein the setting comprises a value included in a user-agent field of at least one of a real-time transport protocol (RTP) and a realtime streaming protocol (RTSP).

19. The network method of claim 11, wherein in the transmitting of the connection request, an ATC priority is further transmitted.

20. The network method of claim 14, wherein the type of the at least one client apparatus comprises a viewer device or storage device, and wherein the ATC priority of the storage device is higher than that of the viewer device.

* * * * *